(12) United States Patent  
Spina et al.

(10) Patent No.: US 11,467,360 B2  
(45) Date of Patent: Oct. 11, 2022

(54) POWER CABLE JOINT COMPRISING OPTICAL FIBERS AND ORGANIZER ACCOMMODATING THEM

(71) Applicant: PRYSMIAN S.P.A., Milan (IT)

(72) Inventors: Nicola Spina, Milan (IT); Gaia Dell'Anna, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 16/767,995

(22) PCT Filed: Nov. 29, 2017

(86) PCT No.: PCT/EP2017/080760  
§ 371 (c)(1),  
(2) Date: May 28, 2020

(87) PCT Pub. No.: WO2019/105537  
PCT Pub. Date: Jun. 6, 2019

(65) Prior Publication Data  
US 2020/0341224 A1 Oct. 29, 2020

(51) Int. Cl.  
*G02B 6/44* (2006.01)

(52) U.S. Cl.  
CPC ......... *G02B 6/4454* (2013.01); *G02B 6/4416* (2013.01)

(58) Field of Classification Search  
None  
See application file for complete search history.

(56) References Cited

U.S. PATENT DOCUMENTS

| 4,244,544 A | * | 1/1981 | Kornat | F16L 3/13 |
| | | | | 248/68.1 |
| 6,259,852 B1 | * | 7/2001 | Daoud | G02B 6/4459 |
| | | | | 385/134 |
| 8,428,420 B2 | * | 4/2013 | Griffiths | G02B 6/4454 |
| | | | | 385/135 |
| 2016/0341924 A1 | | 11/2016 | Park et al. | |

FOREIGN PATENT DOCUMENTS

| CA | 2505289 C | * 10/2010 | ........... G02B 6/4455 |
| CN | 88 1 01087 A | 9/1988 | |
| DE | 40 12 183 A1 | 10/1990 | |
| DE | 42 40 171 A1 | 6/1994 | |
| EP | 0 646 817 A2 | 4/1995 | |
| EP | 0 674 199 A2 | 9/1995 | |

(Continued)

*Primary Examiner* — Rhonda S Peace  
(74) *Attorney, Agent, or Firm* — Seed IP Law Group LLP

(57) ABSTRACT

A power cable joint includes splices and extra-length portions of first and second optical fibers which are included in respective first power cable and second power cable, and a cable joint sleeve (100). The abovementioned splices and extra-length portions are accommodated in an organizer (10) that includes a tray (20) having a recessed area (22) and configured to shapingly fit to an outer surface (101) of the cable joint sleeve (100). In particular, splices and extra-length portions of optical fibers are housed in an upper surface (21) of the tray (20). The organizer (10) further includes a fastener (40) configured to secure the tray (20) to the outer surface (101) of the cable joint sleeve (100) and a cover (50) configured to at least partially cover the upper surface (21) of the tray (20).

19 Claims, 5 Drawing Sheets

(56) References Cited

FOREIGN PATENT DOCUMENTS

| | | | |
|---|---|---|---|
| GB | 2 275 786 A | 9/1994 | |
| JP | 57-118209 A | 7/1982 | |
| JP | 59-212813 A | 12/1984 | |
| WO | 01/03264 A2 | 1/2001 | |
| WO | WO-0103264 A2 * | 1/2001 | ........... G02B 6/4454 |
| WO | WO-2012131309 A1 * | 10/2012 | ........... G02B 6/4442 |

* cited by examiner

POWER CABLE JOINT COMPRISING OPTICAL FIBERS AND ORGANIZER ACCOMMODATING THEM

The present disclosure relates to a power cable joint comprising optical fibers and an organizer accommodating optical fiber extra-length and splices.

The power cable of the disclosure can be used in joints of medium (MV), high (HV) and extra high voltage (EHV) cables.

Typically, power cables rated from MV to EHV comprise the following components: a conductor, a first semiconductive layer arranged in a radially outer position with respect to conductor, an insulating layer arranged in a radially outer position with respect to the first semiconductive layer, a second semiconductive layer arranged in a radially outer position with respect to the insulating layer, a conductive screen arranged in a radially outer position with respect to the second semiconductive layer and an outer sheath arranged in a radially outer position with respect to the conductive screen.

The term "conductor" is used herein to indicate a single metallic rod or a strand formed by a plurality of metallic wires configured to carry on the electrical power. The rod or wires is/are typically made of copper or aluminium or a combination thereof.

The expressions "radially inner" and "radially outer" are used herein to refer to, respectively, a closer position and farther position with respect to a reference longitudinal axis of the power cable, said positions being taken along a direction perpendicular to said longitudinal axis.

In specific cases, for example in submarine applications, the power cables also comprise one or more optical fibers, possibly arranged inside one or more protecting tubes. The optical fibers can be provided in the conductive screen or between the conductive screen and the outer sheath. When the cable has more than one insulated conductor, the optical fibers can be provided in the outer space/s between the conductors. Cables comprising both power conductors and optical fibers are also referred to as "composite cables".

In all the cases where the power cables also include optical fibers, when two power cables are joined the optical fibers have to be spliced and splices and extra-length portions of optical fibers have to be arranged in the cable joint in a protected manner for ensuring subsequent operation.

A splice between two optical fibers provides for an alignment, as precise as possible, of the mated fiber cores. In particular, fiber splicing comprises placing the fibers, preferably free from protective polymeric coatings, in alignment and mechanically or thermally (fusion splice) bonding their aligned ends. The resulting splice can be protected by a tube, for example a metal tube.

Optical fiber splices and extra-length portions of optical fibers need to be properly positioned and fixed within the power cable joint in order to avoid undesired stresses on the optical fibers during jointing operation and in use. Indeed, optical fibers can be very sensitive to bending and crush load, so that a reliable enclosure for the optical fiber splices and extra-length portions of optical fibers has to be provided.

JP S59-21281335 discloses a connection part of a power cable having optical fibers therein. The connection part comprises a conductive coupler mounted on a cable main body and having a two-split structure. The conductive coupler is formed by a large-diameter copper wire joint part located on both sides thereof, a small-diameter extra-length storage part located between the two joint parts, and a large-diameter reinforcing part located in the center of the copper coupler. Fiber core wires are mutually connected with a connection reinforcing part housed in a concave area of the central large-diameter reinforcing part. Extra-length of fiber core wires is wound around the small-diameter extra-length storage part and secured in with a small-diameter binder line or tape, etc.

The Applicant observed that winding the extra-length fibers all around the conductive coupler requires, inter alia, supporting somehow the portions of optical fibers in radially opposite positions with respect to the conductive coupler during winding, which can result in undesired stress or bend on the optical fibers. Furthermore, when winding is completed the optical fibers need to be protected and kept in place, which could also result in undesired stress on the optical fibers. In addition, the provision of a two-split structure each including many different parts make the structure and the manufacturing process of the conductive coupler complex.

JP S57-118209 discloses a method for processing extra-length of optical fiber core wires generated when connecting optical fiber core wires. One or a plurality of extra-length processing sheets is secured onto a cylindrical bobbin in the circumferential direction of said cylindrical bobbin. An optical fiber core wire-connection part is secured onto said sheet to wind the connection extra-length part of the optical fiber core wire around the cylindrical bobbin together with said sheet.

The Applicant observed that such a method does not allow a proper positioning of optical fibers in a power cable joint. In addition, the optical fibers are wound all around the cylindrical bobbin when the sheet is wound, which can result here also in undesired stress on the optical fibers during winding.

EP 0646817 discloses a joint for a composite electrical/optical cable. The composite cable has three insulated power conductors and an optical cable placed in one of the three outer spaces between the conductors. In the joint area, the conductors are arranged in a cradle-like structure and the optical cable is inserted into a jointing cabinet attached to the cradle. The jointing cradle is provided with a bottom part fitted to the curvature of two conductors.

The Applicant observed that the provision of a cradle-like structure and a jointing cabinet substantially increases the size of the joint.

The Applicant felt the need to find a way of orderly accommodating and safely securing optical fiber splices and extra-length portions of optical fibers in a power cable joint. The positioning should not cause undesired stresses or damage on the optical fibers and should be attained in a simple and economic way without substantially increasing the overall joint dimensions.

The Applicant realized that this goal could be achieved by arranging optical fiber splices and extra-length portions of optical fibers in a tray configured to be shapingly fitted and fixed to the outer surface of a cable joint sleeve, the tray being then covered by a convenient cover.

The term "shapingly fitted" is used herein to indicate the coupling by mutual contact of two conjugate surfaces. In the present application, the two conjugate surfaces are the lower surface of the tray and the outer surface of the cable joint sleeve which have, when coupled, substantially the same curvature.

The terms "upper" and "lower" are used herein by referring to the operative configuration of the cable joint, that is to the position of the cable joint after the installation thereof is completed and in operation.

For the purpose of the present description and of the appended claims, except where otherwise indicated, use of the term "a" or "an" is made to describe elements and components of the disclosure. This is done merely for convenience and to give a general sense of the disclosure. This description should be read to include one or at least one and the singular also includes the plural unless it is obvious that it is meant otherwise.

Moreover, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the following of the description, optical fiber splices and extra-length portions of optical fibers could also be collectively referred to as "optical fibers" for sake of conciseness.

Accordingly, in a first aspect, the present disclosure relates to a power cable joint, comprising splices and extra-length portions of first and second optical fibers which are included in respective first power cable and second power cable, and a cable joint sleeve, wherein the splices and extra-length portions of first and second optical fibers are accommodated in an organizer comprising:
- a tray having a recessed area and configured to shapingly fit to an outer surface of the cable joint sleeve and comprising an upper surface configured to house optical fiber splices and extra-length portions of optical fibers;
- a fastener configured to secure the tray to the outer surface of the cable joint sleeve; and
- a cover configured to at least partially cover the upper surface of the tray.

The tray-cover set of the organizer is a compact board which allows a controlled and orderly positioning of optical fiber splices and extra-length portions of optical fibers in a power cable joint as well as a suitable protection of the optical fibers. Optical fibers can be positioned in the tray with no bend lower than the minimum bend radius and are not subjected to undesired stresses during jointing operation and in use.

The term "minimum bend radius" is used herein by referring to a radius measured to the inside curvature of the optical fiber, and it is the radius at which one can bend the fiber without kinking it, damaging it, or shortening its operative life.

The thickness of the tray and of the cover of the present organizer can be so small such as the minimum required for accommodating loops of optical fibers and the relevant splices. In an embodiment, the tray has a thickness of from 2 to 6 mm and the cover has a thickness of from 0.5 to 3 mm. In an embodiment, the overall thickness of the organizer is equal to or lower than 5 mm.

In an embodiment, the tray of the present organizer is a rigid body having a predetermined curvature, more specifically an arc-shaped curvature. The curvature can be substantially equal to the curvature of the outer surface of the cable joint sleeve. Suitable materials for a rigid tray are, for example, polyester, polyvinyl chloride, polyethylene.

In an alternative embodiment, the tray of the present organizer is a flexible body configured to be deformed. In particular, the flexible body is configured to be deformed to take the curvature of the outer surface of the cable joint sleeve. This tray can be adapted to a wide cable joint range. Suitable materials for a flexible tray are, for example, thermoset or thermoplastic polymers such as polyurethane or acrylonitrile butadiene styrene (ABS), or elastomers such as silicone rubber.

The tray, either rigid or flexible, is so shaped to be suitable for one or more predetermined sizes of cable joints which, in turn, fit to power cables with a range of conductor size (for example, a cable joint having a diameter of 130 mm is suitable for jointing cables having a conductor cross section of from 95-2500 $mm^2$).

The cover can be either a rigid body or a flexible body configured to be deformed to take the curvature of the tray when the tray is fitted to the outer surface of the cable joint sleeve and the cover is arranged over the tray. In an embodiment, the cover is a flexible body.

In an embodiment, the tray is a substantially quadrilateral plate.

The tray of the present organizer has an upper surface, intended for the optical fiber accommodation, and a lower surface, intended to be in contact with the joint sleeve.

In an embodiment, the tray has a first side and second side opposing one another and parallel to the longitudinal direction of the cable joint sleeve, and a third side and fourth side opposing one another and parallel along a circumferential direction of the cable joint sleeve.

In one embodiment, the first and second sides have a length shorter than the length of the third and fourth sides.

In another embodiment, the first, second, third and fourth sides have substantially the same length.

In an embodiment, the tray comprises a first through slot near the first side and a second through slot near the second side. Through slots are intended for fastener attachment. Either the first or the second through slot or both can be in a central position with respect to the first or second side length.

In another embodiment, the tray comprises two first through slots near the first side and two second through slots near the second side.

The upper surface of the tray comprises a recessed area comprising a first zone, configured to house the optical fiber splices, and a second and third zone, configured to accommodate the extra-length portions of optical fibers.

In an embodiment, the first zone and second zone are adjacent to each other along a direction parallel to the third and fourth sides of the tray.

In an embodiment, the tray comprises a first partition separating the first zone from the second zone.

In an embodiment, the first zone comprises a plurality of seats for housing respective optical fiber splices, one for each seat.

In an embodiment, the seats of the first zone extend parallel to the first and second side of the tray.

Seats can be defined between two respective parallel walls extending substantially parallel to the first and second side of the tray. A seat can be defined between a parallel wall and the first partition. A seat can be defined between a parallel wall and a wall of the recessed portion parallel to the second side.

In an embodiment, the second zone of the recessed area comprises a central mandrel having a substantially round shape with a predetermined minimum outer radius of curvature. Such minimum outer radius of curvature is substantially greater than the minimum bending radius of the optical fibers, so as to avoid undesired bends of the optical fibers. The minimum outer radius of curvature of the central mandrel can be of from 20 mm to 30 mm.

In an embodiment, a plurality of central retaining elements project cantilevered from the central mandrel along substantially radially external directions with respect to central mandrel in order to retain the optical fibers in position in the tray.

In an embodiment, side retaining elements project cantilevered from the third and fourth sides of the tray over the second zone toward the central mandrel.

In an embodiment, first retaining elements project cantilevered from the first partition toward the central mandrel.

In an embodiment, the tray comprises first guiding elements projecting cantilevered from the first partition toward the first zone for leading optical fibers from the second zone to the first zone while retaining the optical fibers in position in the tray.

The first guiding elements can be provided close to the end portions of the first partition.

In an embodiment, in the third zone optical fibers of the joined cables enter into the tray of the present organizer. The optical fibers can enter the tray still housed in the relevant protecting tube. The protecting tube is terminated inside the tray, few millimetres (e.g. 2 mm) after entering the third zone and leaves the optical fibers bare.

A protecting tube housing optical fibers will be also referred to as "optical fiber unit".

In an embodiment, the second zone is provided between the first zone and the third zone, so that the first zone and the third zone are arranged on opposite sides of the second zone along the circumferential direction of the cable joint sleeve.

In an embodiment, the tray comprises a second partition separating the third zone from the second zone.

In an embodiment, second retaining elements project cantilevered from the second partition toward the central mandrel.

In an embodiment, each of the retaining elements of the present tray projecting cantilevered toward the central mandrel is aligned with a respective retaining element projecting from the central mandrel.

In an embodiment, the tray of the present disclosure comprises second guiding elements for leading optical fibers from the third zone to the second zone while retaining the optical fibers in position in the tray.

The second guiding elements can be provided close to the end portions of the second partition.

In an embodiment, the third zone comprises at least two opposed passageways through which the optical fibers of the joined cables (or, as said above, a protecting tube housing such optical fibers) enter into the tray of the present organizer. Each passageway is provided through one of the third or fourth side of the tray.

In an embodiment, the third zone comprises a third partition which separate the third zone into two sub-zones.

In an embodiment, a first sub-zone is configured to accommodate the portions of optical fibers passing through the passageways. In an embodiment, the optical fibers enter the tray housed in a protecting tube which is terminated and leaves the optical fibers bare into the first and second sub-zone. In an alternative embodiment, the protecting tubes eventually housing the optical fibers are terminated before entering the tray.

In an embodiment, the third partition has curved end portions to guide the optical fibers towards the second zone with a radius of curvature greater than the minimum bending radius of the optical fibers.

In an embodiment, the cover of the organizer of the present disclosure is configured to cover the first zone, the second zone and the third zone, so that all the optical fibers arranged on the tray are protected.

In an embodiment, the cover is a rigid body having the same curvature of the tray. In an alternative embodiment, the cover is a flexible body capable of taking the curvature of the tray when arrange thereupon.

In an embodiment, the cover has a lower surface without grooves or protrusions, so that no stress is imparted to the optical fibers accommodated in the tray when the cover is provided on the tray.

In an embodiment, the cover is a flexible plate having a width at least equal to the length of the first and second side of the tray. In an embodiment, the cover as flexible plate has a minimum length such to cover at least the recessed area of the tray, and a maximum length substantially corresponding to the circumference of the cable joint sleeve. Accordingly, the cover as flexible plate is suitable for covering more than one tray fitted onto the outer surface of a cable joint sleeve.

In an embodiment, the cover of the present organizer can be coupled to the tray by coupling means, such as rivets passing through the cover body, by pressure or by adhesive tapes provided in circumferential direction to overlap at least a portion of the tray sides, in particular along the length of the third and fourth side, and a portion of the joint sleeve.

In an embodiment, the cover is made of a polymeric material, for example, poly[methyl]acrylate, polyvinylchloride or polyethylene. Such polymeric material can be transparent for allowing visual inspection.

In an embodiment, the fastener of the present organizer comprises a hook-and-loop strap.

In the present description and claims, as "hook-and-loop" strap, it is meant a tape consisting of two lineal strips, generally made of fabric, one featuring tiny hooks and the other even smaller and "hairier" loops. When the two strips are pressed together, the hooks catch in the loops and the two strips fasten or bind temporarily. Hook-and-loop strap will be also referred to by the generalized trademark "Velcro".

In an embodiment, a Velcro strap is crooked through a first through slot, circumferentially embraces the joint sleeve and is crooked through a second through slot of the tray in order to secure the tray to the outer surface of the cable joint sleeve.

In another embodiment, when the tray comprises two first through slots and two second through slots, the fastener can comprise two Velcro straps, each configured to crook through a first through slot and, after having circumferentially embraced the joint sleeve, through a second through slot to secure the tray to the outer surface of the cable joint sleeve.

In an alternative embodiment, the fastener of the present organizer comprises a double-sided tape (a tape coated with adhesive on both sides) which can be a pressure-sensitive tape. An insulating tape can be interposed between the double-sided tape and the joint sheath for protecting the sheath from possible interaction between sleeve material and adhesive material of the tape.

In an embodiment, the fastener comprises a hook-and-loop strap and a double-sided tape.

The fastener fixes the tray onto the cable joint sleeve, so that no substantial movement of the tray and, consequently, of the optical fibers accommodated therein, possibly occurs in use.

In an embodiment, the power cable joint of the present disclosure can comprise more than one organizer onto the same cable joint sleeve.

The trays of the organizers can be arranged onto the cable joint outer surface in an array along an axial direction of the cable joint sleeve.

In an alternative embodiment, the trays of the organizers can be arranged onto the outer surface in an array along a circumferential direction of the cable joint sleeve.

The terms "axial" and "circumferential" are used herein by referring, respectively, to a direction parallel to the longitudinal direction of the cable joint sleeve and to an ideal circumference defined on a plane perpendicular to the longitudinal direction of the cable joint sleeve.

When the trays of the organizers are arranged in an array along a circumferential direction, the organizers can share one fastener. For example, the fastener comprises a double-sided tape securing all of the trays onto the cable joint sleeve.

In an embodiment, when the power cable joint comprises more than one organizer onto the same cable joint sleeve, at least one first Velcro strap crooks through a first through slot of the tray of an organizer and through a second through slot of the tray of a circumferentially adjacent organizer to mutually connect the two organizers, and at least another Velcro strap crooks through a second slot of the tray of an organizer and through a first opposite through slot of the tray of an adjacent second organizer to mutually connect the two organizers and secure them onto the cable joint sleeve.

In an embodiment, when the power cable joint comprises more than one organizer onto the same cable joint sleeve, a single cover can be provided for all of the trays. For example, the cover is a flexible plate suitable for covering all of the trays fitted onto the outer surface of the cable joint sleeve.

In a second aspect, the present disclosure relates to a method for accommodating extra-length portions of a first and second optical fibers and optical fiber splices in a power cable joint, the first and second optical fibers being included in respective first power cable and second power cable, the method comprising the following steps:
  providing an organizer comprising a tray, a cover and a fastener, the tray being configured to shapingly fit to an outer surface of a cable joint sleeve;
  fastening the tray on the outer surface of the cable joint sleeve by the fastener;
  providing the extra-length of the first and second optical fibers, optionally contained in a protecting tube, from the first and second power cables;
  accommodating the extra-length portions of the first and of the second optical fibers into the tray;
  splicing the first and second optical fibers together;
  accommodating the resulting splices into the tray; and
  protecting the first and second optical fibers in the tray by the cover.

The first power cable and second power cable comprising the optical fibers to be accommodated according to the present disclosure comprise each an insulated power conductor and a metal screen surrounding it. In the first and second power cables, the optical fibers or the optical fiber units are wound with or in the vicinity of the metal screen.

Further features and advantages of the present disclosure will appear more clearly from the following detailed description of embodiments thereof, such description being provided merely by way of non-limiting example and being made with reference to the annexed drawings, wherein.

Figure 1:
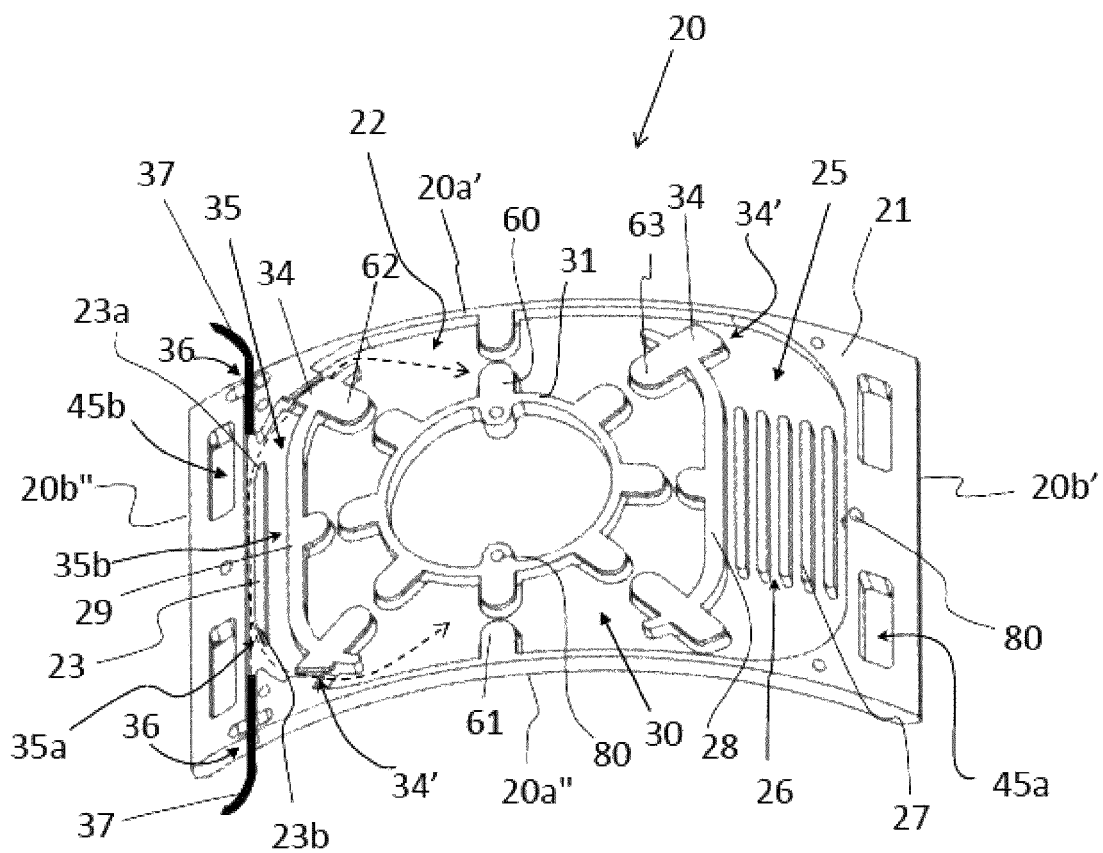
FIG. 1 is a perspective view of the tray an organizer according to an embodiment of the present disclosure.

In the drawings, numeral reference 10 indicates an embodiment of an organizer according to the present disclosure.

Organizer 10 is used when two power cables including optical fibers, possibly arranged inside one or more protecting tubes 37, are to be joined. Preferably, the power cables are single-phase MV, HV and EHV cables, more preferably HV and EHV cables.

Figure 2:
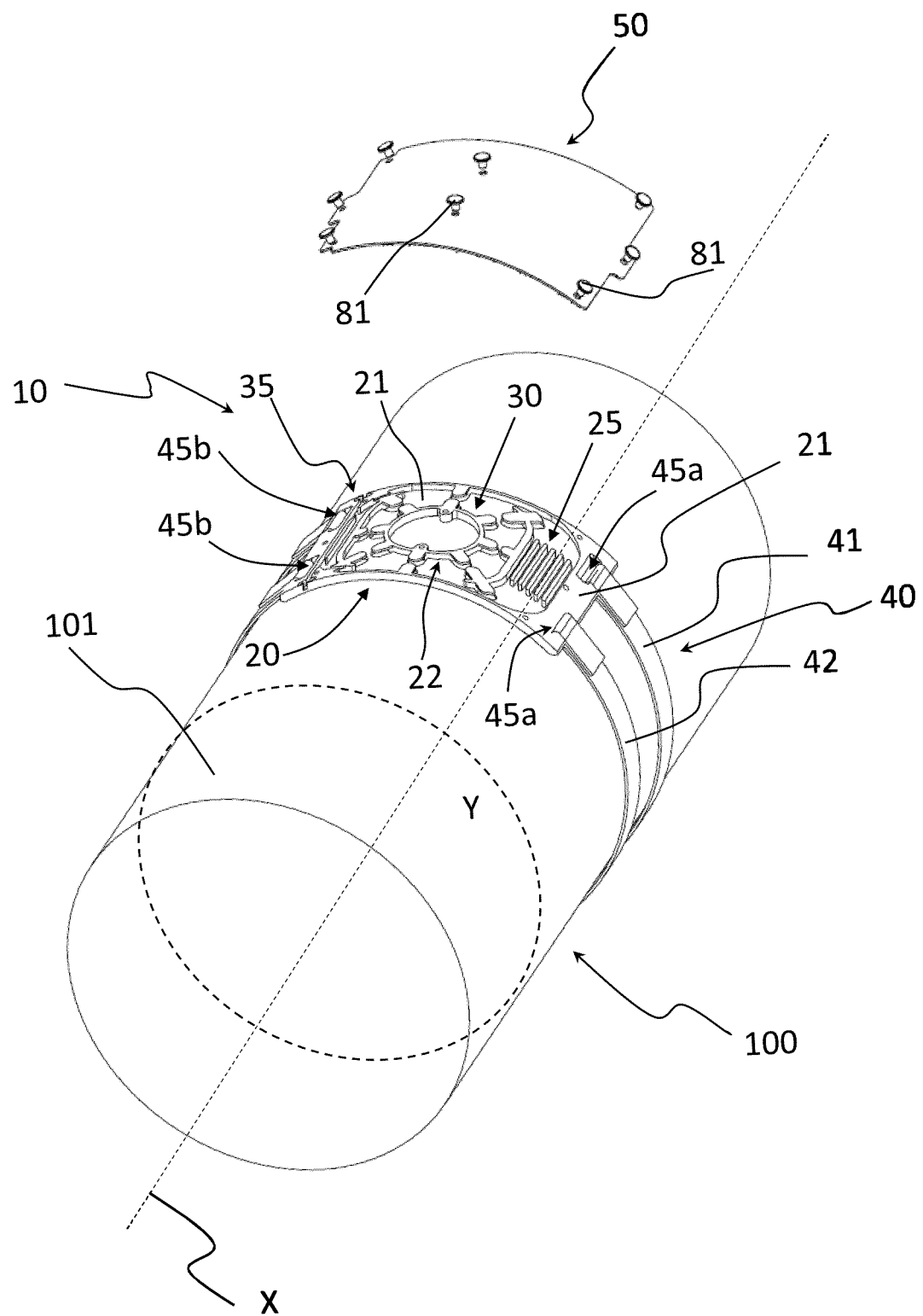
FIG. 2 is a sketched perspective view of a power cable joint with an organizer according to an embodiment of the present disclosure and with the tray of FIG. 1 secured to a joint sleeve by fastener, and a cover ready to be put in place.
Figure 3:
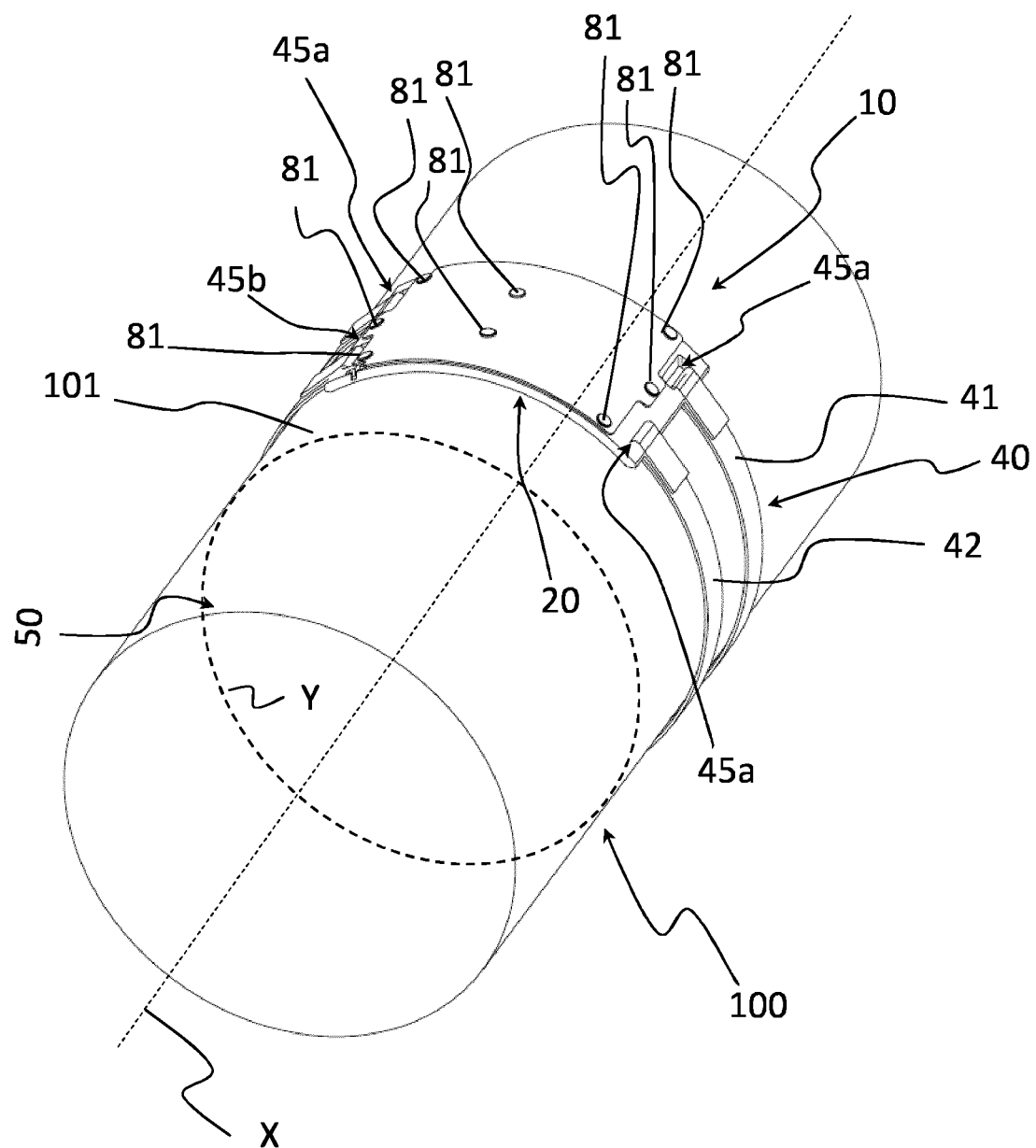
FIG. 3 is a sketched perspective view of the joint and organizer of FIG. 2 secured to the joint sleeve, the organizer being shown in an assembled and operative configuration thereof.

Organizer 10 allows firmly and orderly accommodating optical fiber splices and extra-length portions of optical fibers over a power cable joint sleeve 100, which is schematically shown in FIGS. 2 and 3.

The cable joint sleeve 100 extends along a substantially rectilinear longitudinal axis X, shown in FIGS. 2 and 3.

The cable joint sleeve 100 has preferably a substantially cylindrical shape with a diameter comprised between 130 mm and 450 mm.

In the exemplary embodiment shown in FIGS. 2 and 3, the cable joint sleeve 100 has a diameter equal to 238 mm.

As shown in FIGS. 2 and 3, organizer 10 comprises a tray 20 configured to shapingly fit on the outer surface 101 of the cable joint sleeve 100, a cover 50 configured to couple to the upper surface 21 of the tray 20 so as to at least partially cover it, and a fastener 40 configured to secure the tray 20 on the outer surface 101 of the cable joint sleeve 100.

Referring to FIG. 1, the tray 20 is a substantially quadrilateral plate, with a first side 20b' and second side 20b" opposing one another and parallel to the longitudinal direction X of the cable joint sleeve 100 and a third side 20a' and fourth side 20a" opposing one another and oriented along a circumferential direction Y of the cable joint sleeve 100, first side 20b' and second side 20b" being substantially perpendicular to third side 20a' and fourth side 20a".

In the tray of FIG. 1, the first and second sides 20b', 20b" are shorter than the third and fourth sides 20a', 20a".

In an exemplary embodiment, the size of the tray 20 can be 160 mm×100 mm×4 mm (length×width×thickness).

The tray 20 shown in the attached figures is a rigid body having a predetermined curvature which is substantially equal to the curvature of the outer surface 101 of the cable joint sleeve 100.

In an embodiment not shown the tray 20 is a flexible body configured to be deformed to take the curvature of the outer surface 101 of the cable joint sleeve 100 when the tray 20 is coupled to the cable joint sleeve 100.

In both the embodiments discussed above, when coupled with the outer surface 101 of the cable joint sleeve 100, the tray 20 takes the configuration shown in FIGS. 2 and 3.

In the embodiment shown in the attached figures, the tray 20 is secured to the outer surface 101 of the cable joint sleeve 100 by a fastener 40 comprising two Velcro straps 41, 42.

The tray 20 comprises two first through slots 45a near the first side 20b' and two second through slots 45b near the second side 20b" where the Velcro straps 41, 42 pass through. In particular, as shown in FIGS. 2 and 3, each of the two Velcro straps 41, 42 passes through a respective slot 45a and extends around the outer surface 101 of the cable joint sleeve 100 to reach a corresponding slot 45b to securely fix the tray 20 onto the outer surface 101 of the cable joint sleeve 100.

The upper surface 21 of the tray 20 comprises a recessed area 22 wherein three different zones are defined: a first zone 25 close to the first side 20b' of the tray 20, a second zone 30 adjacent to the first zone 25 along a direction parallel to the third and fourth side 20a', 20a" and a third zone 35 close to the second side 20b" of the tray 20. The second zone 30 is thus arranged between the first zone 25 and the third zone 35 along the circumferential direction Y substantially parallel to the third and fourth side 20a', 20a".

The recessed area 22 has a substantially rectangular shape with rounded corners.

The slots 45a, 45b are formed on non recessed portions of the upper surface 21 of the tray 20 on opposite sides of the recessed area 22.

A first partition 28 separates the second zone 30 from the first zone 25.

A second partition 29 separates the second zone 30 from the third zone 35.

The first zone 25 is provided for accommodating optical fiber splices.

The second zone 30 and third zone 35 are provided for accommodating extra-length portions of optical fibers upstream of optical fiber splices.

The third zone 35 comprises two opposed passageways 36, one into the third side 20a' and one into the fourth side 20a". Through each passageway 36, the optical fibers of the one of the two power cables to be joined are received in the tray 20.

Passageways 36 are defined by no-through slots formed on the upper surface 21 of the tray 20 to allow insertion of the optical fibers.

A third partition 23 is arranged in the third zone 35 to define two sub-zones, a first sub-zone 35a and a second sub-zone 35b. The first sub-zone 35a is configured to accommodate a length of optical fibers passing through the one passageways 36.

Third partition 23 extends along a direction parallel to the second sides 20b" and comprises curved end portions 23a, 23b having a radius of curvature greater than or equal to the minimum bending radius of the optical fibers. The end portions 23a, 23b guide the optical fibers arranged in the first zone 35a towards the second area 30.

The end portions of second partition 29 are curved walls to guide passage of the optical fibers from the third zone 35 to the second zone 30.

Such curved walls have a radius of curvature greater than or equal to the minimum bending radius of the optical fibers.

End retaining elements 34 project cantilevered from the top surface of end portions of the second partition 29 over the third area 35.

A no-through slot 34' is provided adjacent to each end retaining element 34 to allow insertion of the optical fibers from above under the end retaining elements 34.

The second zone 30 comprises a central mandrel 31 having a substantially circular shape with a radius of curvature greater than or equal to the minimum bending radius of the optical fibers.

The end portions of the first partition 28 are curved walls to guide passage of the optical fibers from the second zone 30 to the first zone 25.

Such curved walls have a radius of curvature greater than or equal to the minimum bending radius of the optical fibers.

End retaining elements 34 project cantilevered from the top surface of end portions of the first partition 28 over the first area 25.

A no-through slot 34' is provided adjacent to each end retaining element 34 to allow insertion of the optical fibers from above under the end retaining elements 34.

Extra-length portions of optical fibers are wounded around the central mandrel 31.

A plurality of central retaining elements 60 project cantilevered from a top surface of the central mandrel 31 along substantially radial directions with respect to the central mandrel 31. In the embodiment shown in the attached figures, eight retaining elements 60 are provided, each of them being angularly spaced apart from two adjacent retaining elements 60 by an angle of 45°.

Side retaining elements 61 project cantilevered from the top surface of each of the third and fourth side 20a', 20a" of the tray 20 over the second zone 30 toward the central mandrel 31. Each side retaining elements 61 is aligned to a respective central retaining element 60 and defines with the central retaining element 60 a no-through slot to allow insertion of the optical fibers from above under the central retaining element 60 and the side retaining elements 61.

Second retaining elements 62 project cantilevered over the second zone 30 from the top surface of second partition 29. In the embodiment shown in the attached figures, three second retaining elements 62 are provided, each of them being aligned to a respective central retaining element 60 and defining with the central retaining element 60 a no-through slot to allow insertion of the optical fibers from above under the central retaining element 60 and the second retaining elements 62.

First retaining elements 63 project cantilevered over the second zone 30 from the top surface of first partition 28. In the embodiment shown in the attached figures, three first retaining elements 63 are provided, each of them being aligned to a respective central retaining element 60 and defining with the retaining element central 60 a no-through slot to allow insertion of the optical fibers from above under the central retaining element 60 and first retaining elements 63.

The first zone 25 comprises a plurality of seats 26 for housing optical fiber splices.

Each seat 26 extend parallel to the first side 20b' of the tray 20 and can be defined between two respective parallel walls 27. Two seats 26 are defined between a parallel wall 27 and the first partition 28 or the wall of the recessed area 25 parallel to the first side 20b'.

The optical fiber splices are inserted in the seats 26 from above.

A plurality of holes 80 can be formed on the upper surface 21 of the tray 20 to allow coupling of the cover 50 to the tray 20.

In the exemplary embodiment shown in the attached figures, eight holes 80 are formed, three holes 80 being provided close to the first side 22b', other three holes 80 being provided close to the opposite second side 22b" and two holes 80 being provided on the central mandrel 31 at 180° from each other.

Holes 80 can be absent when the cover 50 is coupled to the tray 20 by pressure, or when the cover 50 is a flexible plate secured onto the tray 20 by adhesive tapes.

Cover 50 is a body configured to have or to get substantially the same curvature of the tray 20.

The size of the cover 50 is such as to cover at least the first zone 25, the second zone 30 and the third zone 35.

Cover 50 shown in the attached FIGS. 2 and 3 is a rigid body having a curvature which is substantially equal to the curvature of the tray 20.

When coupled with the tray 20 the cover 50 takes the configuration shown in FIG. 3. A plurality of rivets 81 (eight in the exemplary embodiment shown in FIGS. 2 and 3) are provided to be inserted onto respective holes formed on the cover 50 to then be inserted onto the holes 80 formed on the tray 20 to allow coupling of the cover 50 with the tray 20.

Figure 4:
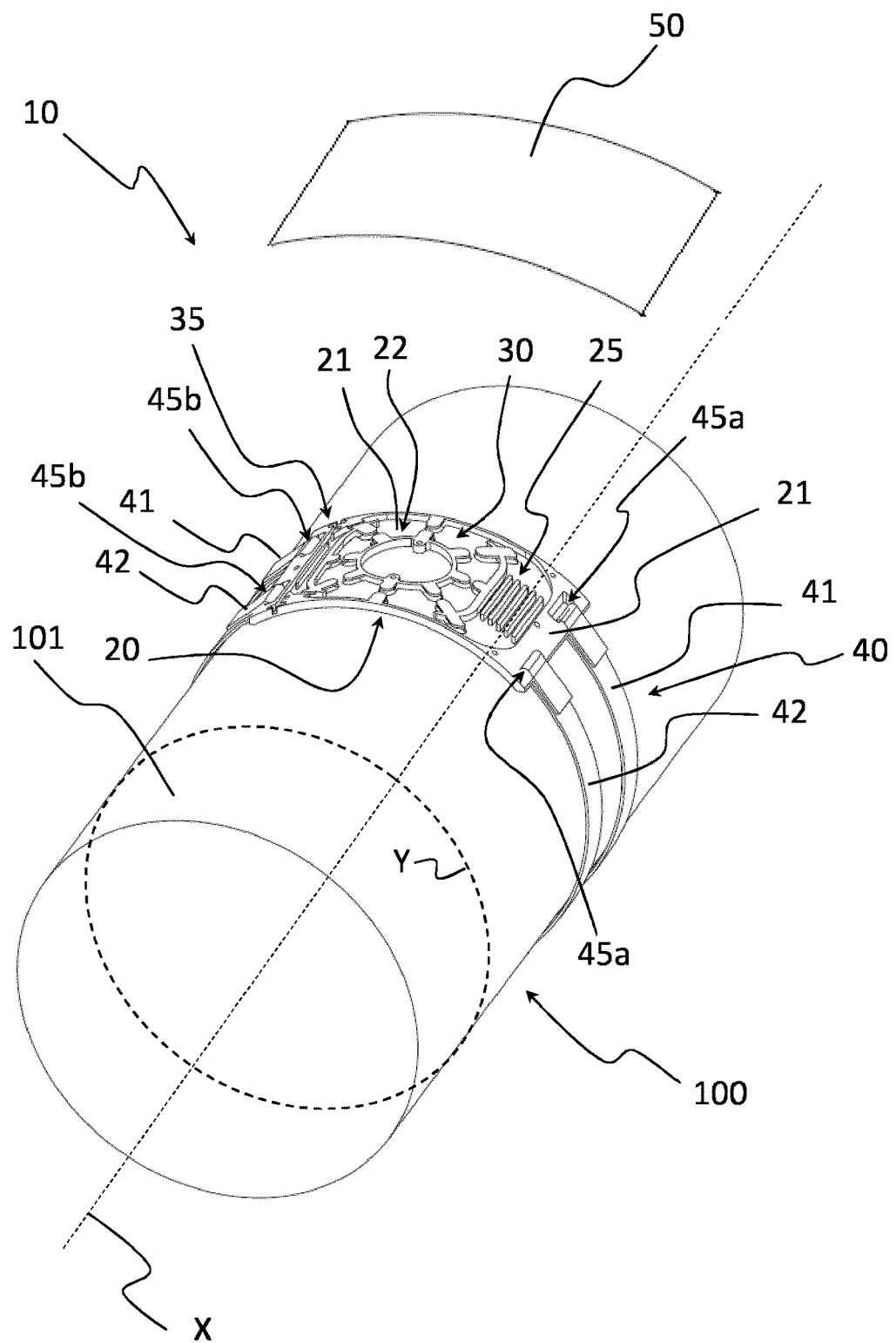
FIG. 4 is a sketched perspective view of the power cable joint with an organizer according to another embodiment of the present disclosure and with the tray of FIG. 1 secured to the joint sleeve by fastener, and a cover ready to be put in place.

In the embodiment of FIG. 4, the cover 50 is a flexible body, specifically a flexible plate configured to be deformed to take the curvature of the tray 20 and of the outer surface 101 of the cable joint sleeve 100 when the tray 20 is coupled to the outer surface 101 of the cable joint sleeve 100 and the cover 50 is arranged over the tray 20. In the embodiment depicted in FIG. 4, the cover 50 has a length substantially similar to the length of the tray 20 along the third and fourth side 20a', 20a". A single cover 50 having a greater length is suitable for covering all of the trays 20', 20" and 20''' shown in FIG. 5.

The cover 50 of FIG. 4 is linked to the outer surface 101 by adhesive tapes.

Figure 5:
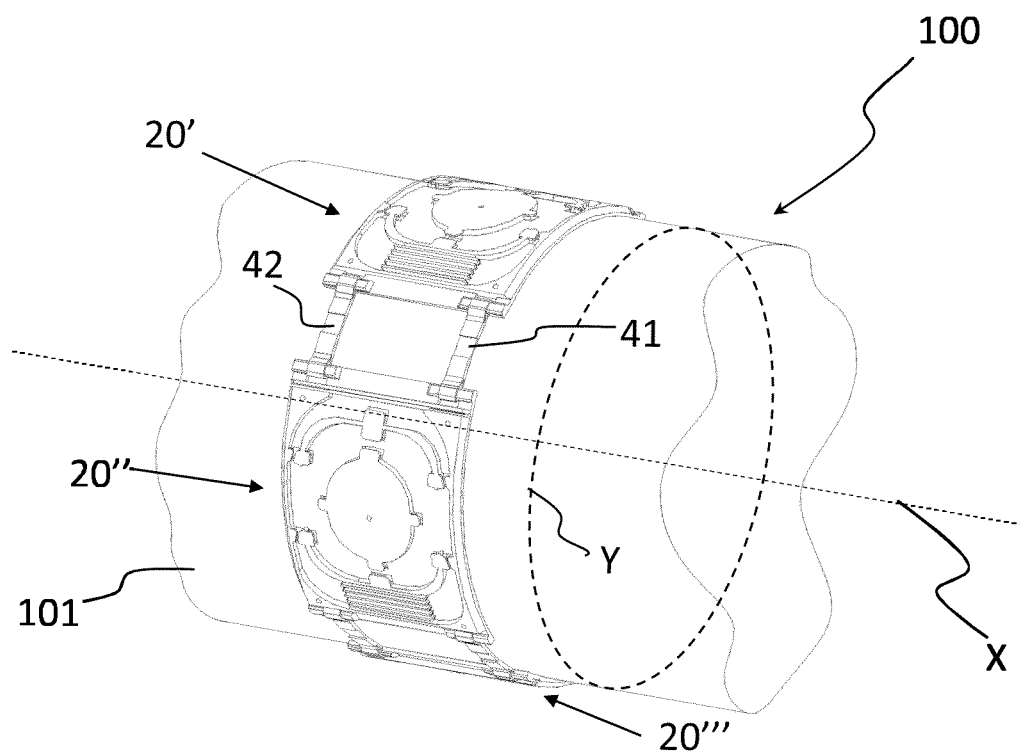
FIG. 5 is a sketched perspective view of the power cable joint of the present disclosure with a plurality of trays of FIG. 1 secured to the joint sleeve by fasteners of FIG. 2.

FIG. 5 shows a joint sleeve 100 where more organizers 20', 20" and 20''' are fitted onto the outer surface 101 in an array along the circumferential direction Y and fastened by a plurality of Velcro straps 41, 42. In the embodiment of FIG. 5, a cover (not illustrated) like cover 50 of FIG. 4 is arranged over all of the tray 20', 20" and 20''', then kept in place by fasting its ends (which can be joined if the cover has a length such to encircle the joint sleeve 100) by one or more adhesive tapes (which can be insulating tapes). Further adhesive tapes can be circumferentially provided to link the cover to the outer surface 101 of the joint sleeve 100.

In use, the operator fits the tray 20 to the outer surface 101 of the cable joint sleeve 100 by, for example, Velcro strap 41, 42 and/or by a double sided adhesive tape. Then, the operator accommodates the exposed optical fiber portions of the two power cables to be joined in the recessed area 22 of the upper surface 21 of the tray 20. Finally the operator covers the tray 20 with the cover 50 and couples the cover 50 to the tray 20 by the rivets 81.

Once fastened the tray 20 on the outer surface 101 of the joint sleeve 100, the accommodation of the extra-length portions of optical fibers in the tray 20 and of the optical fibers splices in the recessed area 22 may comprise:

inserting portions of optical fibers (or of the protecting tube 37 containing them) of the two power cables from above in the passageways 36,
    inserting the extra-length portions of optical fibers from one power cable in the first sub-zone 35a;
    routing the extra-length portions of optical fibers to the second zone 30 by the end portions of partition 29;
    winding parts of the extra-length portions of optical fibers around the central mandrel 31 and under the central, side, first and/or second retaining elements 60, 61, 62, 63 (depending on the number of optical fibers to be wound);
    routing the extra-length portions of optical fibers to the first zone 25 by the end portions of partition 28;
    splicing the optical fibers;
    inserting the resulting splices in the seats 26.

In an embodiment, the portions of optical fibers or of the protecting tube 37 containing them inserted in the passageways 36 are then kept in place by plugs (not illustrated).

When the optical fibers are contained in a protecting tube 37, the protecting tube 37 is cut at a length similar to that of the passageway 36 and the optical fibers are released therefrom to be accommodated and spliced in the tray 20.

Different paths for the exposed optical fibers of the two power cables to be joined can be defined in the recessed area 22 from the passageways 36 to the seats 26, passing through the central zone 30.

Substantially no exposed portions of optical fibers are provided outside the organizer 10.

Once the optical fibers are accommodated and spliced into the organizer 10 of the present disclosure, the cable joint manufacturing process can proceed by adding suitable further covers and protections.

The invention claimed is:

1. A power cable joint, comprising a cable joint sleeve and an organizer configured to accommodate splices and extra-length portions of first and second optical fibers that are included in respective first and second power cables, the organizer comprising:
    a tray having a recessed area and configured to shapingly fit to an outer surface of the cable joint sleeve and comprising an upper surface configured to house the splices and the extra-length portions of the first and second optical fibers;
    a fastener configured to secure the tray to the outer surface of the cable joint sleeve; and
    a cover configured to at least partially cover an upper surface of the tray,
    wherein the fastener includes one or more of a tape coated with adhesive on both sides or a hook-and-loop strap.

2. The power cable joint of claim 1, wherein the tray includes a rigid body having a curvature which is substantially equal to a curvature of the outer surface of the cable joint sleeve.

3. The power cable joint of claim 1, wherein the tray includes a flexible body configured to be deformed to take a curvature of the outer surface of the cable joint sleeve.

4. The power cable joint of claim 1, wherein the tray has a first side and a second side opposing one another and parallel to a longitudinal direction of the cable joint sleeve, and a third side and a fourth side opposing one another and parallel along a circumferential direction of the cable joint sleeve, the first and second sides each having a length shorter than a length of each of the third and fourth sides.

5. The power cable joint of claim 4, wherein the cover is a flexible plate having a width at least equal to the length of each of the first and second sides of the tray, and having a minimum length to cover the recessed area of the tray.

6. The power cable joint of claim 4, wherein the cover is coupled to the tray by adhesive tapes provided along the circumferential direction to overlap at least a portion of the length of each of the third and fourth sides and a portion of the joint sleeve.

7. The power cable joint of claim 4, wherein the fastener comprises a hook-and-loop strap and the tray comprises a first through slot near the first side and a second through slot near the second side.

8. The power cable joint of claim 1, wherein the cover is either a rigid body or a flexible body configured to be deformed to take a curvature of the tray when the tray is fitted to the outer surface of the cable joint sleeve and the cover is arranged over the tray.

9. The power cable joint of claim 1, wherein the cover is made of a transparent polymeric material.

10. The power cable joint of claim 1 comprising more than one organizers arranged onto the cable joint sleeve, wherein the trays of the organizers are arranged onto the outer surface in an array along a circumferential direction of the cable joint sleeve.

11. The power cable joint of claim 10 wherein the organizers share the fastener.

12. The power cable joint of claim 10 wherein the organizers share the cover.

13. An organizer comprising:
a tray including a rigid body configured to shapingly fit to an outer surface of a cable joint sleeve and having a curvature substantially equal to a curvature of the outer surface of the cable joint sleeve; and
a fastener including one or more of a tape coated with adhesive on both sides or a hook-and-loop strap and configured to secure the tray to the outer surface of the cable joint sleeve.

14. An organizer comprising:
a tray including a flexible body configured to be deformed to take a curvature of an outer surface of a cable joint sleeve; and
a fastener including one or more of a tape coated with adhesive on both sides or a hook-and-loop strap and configured to secure the tray to the outer surface of the cable joint sleeve.

15. A method for accommodating extra-length portions of first and second optical fibers and optical fiber splices in a power cable joint, the first and second optical fibers being included in respective first power cable and second power cable, the method comprising the following acts:
providing an organizer comprising a tray, a cover and a fastener, the tray being configured to shapingly fit to an outer surface of a cable joint sleeve of the power cable joint, the fastener including one or more of a tape coated with adhesive on both sides or a hook-and-loop strap;
fastening the tray on the outer surface by the fastener;
providing the extra-length portions of the first and second optical fibers from the first and second power cables;
accommodating the extra-length portions of the first optical fiber and the second optical fiber into the tray sequentially;
splicing the first and second optical fibers together to generate splices;
accommodating the splices in the tray; and
covering the first and second optical fibers in the tray by the cover.

16. A power cable joint, comprising a cable joint sleeve and more than one organizers arranged onto the cable joint sleeve, the organizers configured to accommodate splices and extra-length portions of first and second optical fibers that are included in respective first and second power cables, the organizers each comprising:
a tray having a recessed area and configured to shapingly fit to an outer surface of the cable joint sleeve and comprising an upper surface configured to house the splices and the extra-length portions of the first and second optical fibers; and
a cover configured to at least partially cover an upper surface of the tray,
wherein trays of the organizers are arranged onto the outer surface in an array along a circumferential direction of the cable joint sleeve; and
wherein the organizers share a fastener configured to secure the trays of the organizers to the outer surface of the cable joint sleeve the fastener.

17. The power cable joint of claim 16, wherein the tray includes a rigid body having a curvature which is substantially equal to a curvature of the outer surface of the cable joint sleeve.

18. The power cable joint of claim 16, wherein the tray includes a flexible body configured to be deformed to take a curvature of the outer surface of the cable joint sleeve.

19. The power cable joint of claim 16, wherein the fastener includes one or more of a tape coated with adhesive on both sides or a hook-and-loop strap.

* * * * *